United States Patent [19]

Schumacher et al.

[11] 3,827,421

[45] Aug. 6, 1974

[54] HYDRAULIC BLADE MOUNT

[75] Inventors: Frederick A. Schumacher, Wyckoff; Keith H. Wolos, Butler, both of N.J.

[73] Assignee: Silicon Technology Corporation, Oakland, N.J.

[22] Filed: June 29, 1973

[21] Appl. No.: 375,038

[52] U.S. Cl. ................. 125/15, 51/73 R, 51/206 R
[51] Int. Cl. .............................................. B28d 1/04
[58] Field of Search ............ 125/15; 51/206 R, 73 R

[56] References Cited
UNITED STATES PATENTS

| | | | |
|---|---|---|---|
| 3,175,548 | 3/1965 | Weiss | 51/206 R X |
| 3,556,074 | 1/1971 | Nelke et al. | 125/15 |

*Primary Examiner*—Harold D. Whitehead
*Attorney, Agent, or Firm*—Amster & Rothstein

[57] ABSTRACT

An inside diameter cutting blade is mounted in a circular saw blade housing. The cutting blade is tensioned by pressurized hydraulic fluid within a channel which causes a fluid-tight gasket in the channel to bear against and tension the outer circumference of the blade. Accurate and uniform tensioning of the cutting blade is accomplished by the pressure of the hydraulic fluid, which uniformly deforms the gasket. The hydraulic fluid is water soluble and permits easy cleanup should any of the fluid leak past the gasket. The use of a bleed fitting permits total release of tensioning pressure, required during blade changes without complete removal of tensioning fluid thus permitting return to full blade tensioning pressure in greatly reduced time.

10 Claims, 3 Drawing Figures

PATENTED AUG 6 1974
3,827,421
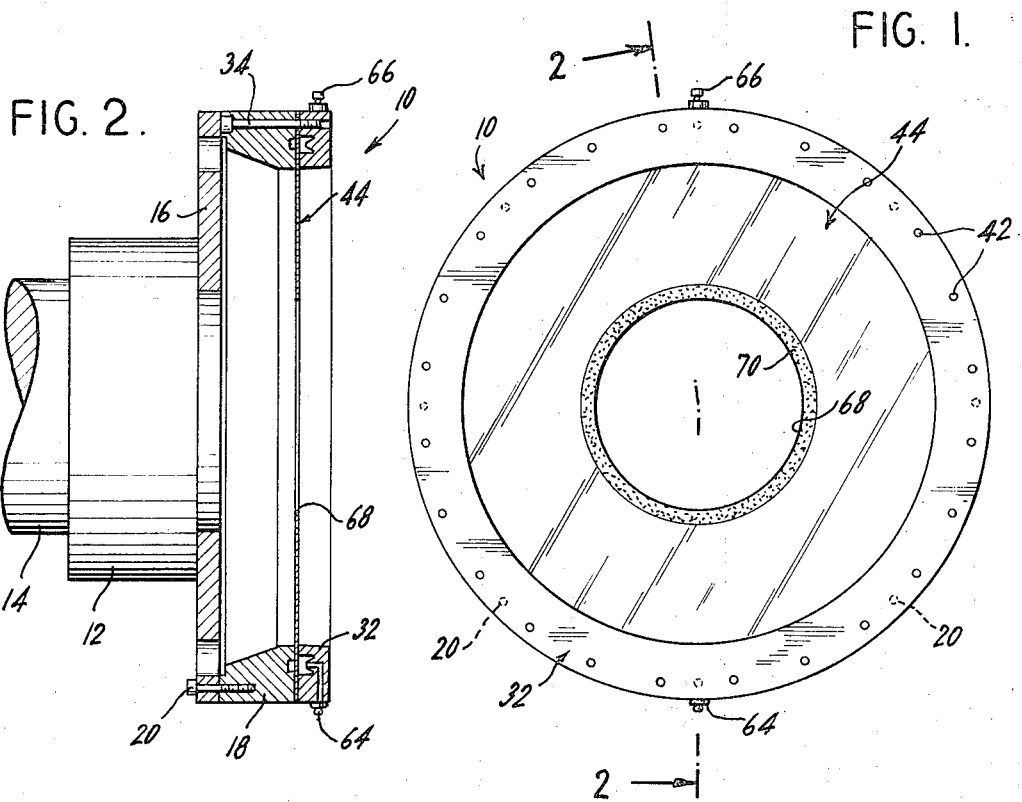
FIG. 1.
FIG. 2.
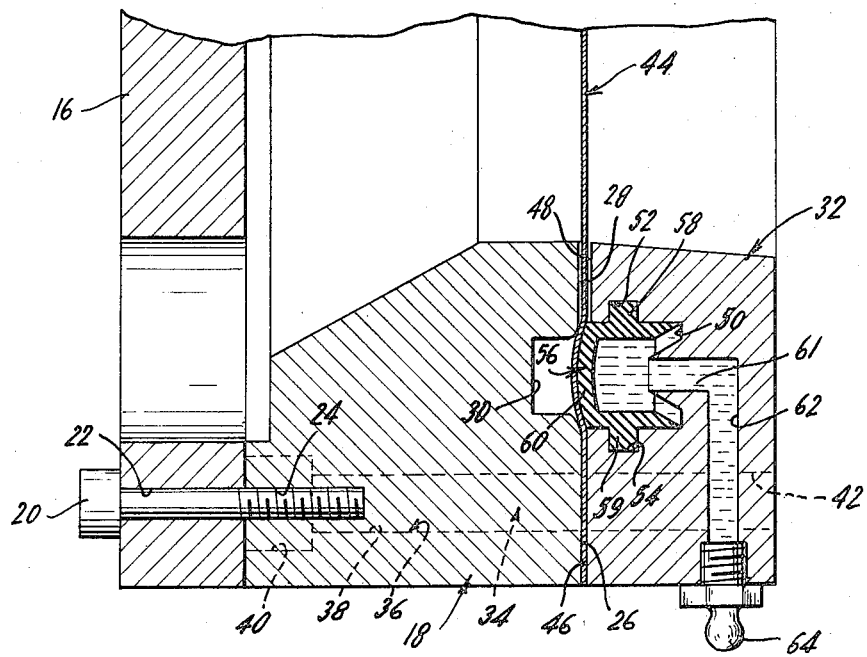
FIG. 3.

HYDRAULIC BLADE MOUNT

The present invention relates generally to article tensioning devices, and in particular to a hydraulically operated article tensioning device.

The use of extremely thin silicon wafers in the electronics industry, typically on the order of 0.007 inches in thickness, has been on the increase in recent years. Such wafers are usually cut from large silicon crystals grown specifically for the purpose of providing material to be cut into these individual wafers.

The diameter of the specially-grown wafers often approximates three inches, and uniformity of size and surface configuration of the wafers is extremely important. In order to slice extremely thin, large diameter wafers, minimize waste of the expensive silicon crystal material, and provide wafers which have smooth, unscarred surfaces, special cutting blades have had to be devised.

The cutting blade which is required must be thin enough to provide the desired thin wafer while minimizing waste of the material. The cutting blade must also have the rigidity to be able to slice through a 3-inch diameter wafer. These requirements demand a blade with a thinness and rigidity not obtainable in ordinary outside diameter cutting blades.

In order to provide a cutting blade with the required characteristics of thinness, rigidity and cutting depth capability, a thin circular saw blade is clamped about its circumference and an opening is provided in the center of the blade. The blade so formed is then mounted on a saw blade housing, thus forming an inside diameter (hereinafter sometimes referred to as an "ID") blade.

Numerous slicing machines utilizing ID blades have appeared on the market in which a circular saw blade is first clamped in position and then tensioned to provide a rigid cutting surface.

In early slicing machines mechanical means were provided for tensioning the saw blade once it was clamped. Mechanical tensioning, however, proved to be less than satisfactory as it was difficult, if not impossible, to control or predict the amount of tension which would be transmitted to various circumferential locations on the saw blade. The difficulty arose as a result of the difficulty of precise repeatable movement of mechanical tensioning means at specific fixed positions about the saw blade's periphery.

Further, due to the mechanical application of tensioning forces, the mechanically tensioned saw blades experienced often very severe hysteresis and friction losses. These losses contributed to the inaccuracy of the mechanical tensioning system.

In order to overcome some of the difficulties encountered with mechanical tensioning systems, of recent times hydraulic blade tensioning systems have appeared on the market. In some of the systems available, the hydraulic fluid or grease which is used as the tensioning medium is contained in an annular groove in a clamping ring of the slicing machine. The grease is pressurized and forced into direct contact with a segment of the saw blade near the periphery thereof. The pressure which is applied to the tensioning medium, in turn, impinges upon the blade and gives a significantly more predictable amount of tension for a given amount of hydraulic pressure than was possible with mechanically tensioned saw blades.

Additionally, the hydraulically tensioned saw blade is not subject to the hysteresis and friction losses present in a mechanically tensioned system.

In a typical prior art hydraulically tensioned blade assembly, e.g., U.S. Pat. No. 3,556,074, the hydraulic fluid or grease is prevented from moving onto the saw blade by "O" rings which are designed to bear against the saw blade and prevent escape of the hydraulic fluid or grease from the annular cavity containing the same.

In practice, however, the O-rings acquire a permanent set due to the forces required in clamping and tensioning a particular blade. This permanent set of the O-rings permits creep of the hydraulic fluid or grease upon use of a different blade or repositioning the same blade after removal for resurfacing or the like.

It is an object of the present invention to provide an apparatus for hydraulically tensioning a saw blade while avoiding direct contact between the hydraulic fluid and the saw blade.

It is a more particular object of the present invention to provide a water soluble hydraulic fluid which is contained within a gasket and which exerts tensioning pressure upon the saw blade by applying pressure thereto through the medium of the gasket.

In accordance with a specific embodiment of the present invention, a blade mounting and tensioning apparatus comprises first and second annular clamping members and means for clamping the periphery of a blade between the clamping members. An annular fluid channel within one of the clamping members is located radially inward of the clamping means. The annular fluid channel has an opening therein confronting one side of the blade. An annular recess channel within the other of the clamping members is radially aligned with the annular fluid channel and the annular recess channel has an opening therein confronting the other side of the blade. A deformable gasket appears within the annual fluid channel opening and fluid appears within the annual fluid channel. The gasket is constructed and arranged to seal the fluid within the annular fluid channel against contact with the blade. The gasket is further constructed and arranged to bear against a clamped blade whereby pressure which is exerted on the fluid uniformly deforms the gasket against the blade, thereby uniformly deforming the blade into the recess channel and uniformly tensioning the blade.

The above brief description, as well as further objects, features and advantages of the present invention will be more fully understood by reference to the following detailed description of the presently preferred, but nontheless illustrative embodiment in accordance with the present invention, when taken in conjunction with the accompanying drawing, wherein:

FIG. 1 is a front view of a saw blade and saw blade housing of the present invention;

FIG. 2 is a sectional view taken along the line 2—2 of FIG. 1 looking in the direction of the arrows; and FIG. 3 is an enlarged partial sectional view of the saw blade housing of FIG. 2.

Referring now specifically to the drawing, in accordance with one illustrative embodiment demonstrating objects and features of the present invention, there is provided a saw blade housing, generally designated by the reference numeral 10, which is attached, by means of a hub 12, to the drive shaft 14 of a slicing machine (not shown). It is to be understood that while the blade tensioning device of the present invention is described as usable with an ID cutting blade for slicing thin sections of crystal, such a use is merely an illustrative example of the application of the present invention, and other applications of the present invention are possible and are considered to be within the contemplation thereof.

In a preferred embodiment, a spindle plate 16 is shown attached to the hub 12 by any conventional means, not shown. A generally cylindrical, annular tensioning ring 18 is attached to the spindle plate 16 by tensioning ring bolts 20. The tensioning ring bolts 20 are inserted through a series of cylindrical openings 22 equally spaced about the spindle plate 16 and engage a series of corresponding threaded openings 24 within the tensioning ring 18, thereby providing secure attachment of the tensioning ring to the spindle plate.

The tensioning ring 18 includes a radially outer clamping surface 26, to be more fully described hereinafter, which extends axially a predetermined distance from the spindle plate 16. A non-clamping or clearance surface 28 appears on the tensioning ring 18 radially inward of the clamping surface 26 and is located a somewhat smaller predetermined axial distance from the spindle plate 16. A circumferential, annular tensioning ring recess 30 appears between the clamping and clearance surfaces 26, 28 for a purpose to be described hereinafter.

An annular clamping ring 32, of substantially the same diameter as the tensioning ring 18, is removably fixed thereto by means of clamping ring bolts 34. The clamping ring bolts 34 are located within openings 36 in the tensioning ring 18 evenly spaced about the tensioning ring. The openings 36 include a smaller diameter portion 38 for accommodating the shank of the clamping ring bolt and a larger diameter portion 40 for accommodating the head of the bolt 34 in order that the entire bolt 34 may be recessed within the tensioning ring 18. A correspondingly sized, internally threaded, opening 42 appears within the clamping ring 32 and is engaged by the clamping ring bolt 34 to clamp an annular saw blade 44 between the tensioning ring 18 and the clamping ring 32.

The annular saw blade 44 is positioned with locating pin holes (not shown) over locating pins (also not shown) projecting from the tensioning ring 18. The clamping ring 32, which has openings therein (not shown) corresponding to the locating pins is then aligned with the locating pins and each of the plurality of clamping ring bolts 34 are tightened or torqued to the same value.

The clamping ring 32 includes a radially outer clamping surface 46 which is located axially closer to the spindle plate 16 than is a radially inner non-clamping or clearance surface 48. The clamping ring 32 also includes an annular circumferential fluid channel or cavity 50 located between the clamping and clearance surfaces 46, 48 for a purpose to be described hereinafter.

The particular construction of the clamping surfaces 26, 46 and the clearance surfaces 28, 48 of the tensioning and clamping rings 18, 32 provides for a clearance between the clamped blade 44 and each of the clearance surfaces 28, 48. The purpose of this clearance shall be discussed in greater detail hereinafter. The clearance surfaces 28, 48 may be formed in any convenient manner in order to axially raise said clearance surfaces with respect to said clamping surfaces 26, 46.

The clamping surfaces 26, 46 of the tensioning and clamping rings 18, 32 are, as noted hereinbefore, displaced or axially raised and closer together than the clearance surfaces 28, 48 of the tensioning and clamping rings 18, 32 when the saw blade housing 10 is in its assembled condition. This difference in distance may be accomplished by initially forming the surfaces 46, 48 and the surfaces 26, 28 of the tensioning and the clamping rings to be co-planar. Either or both of the clamping surfaces 26, 46 are then plated with a tough, durable corrosion-resistant material such as nickel or the like to raise and axially displace the clamping surfaces 26, 46 with respect to the clearance surfaces 28, 48 a sufficient amount to afford clearance for the annular blade 44 between the clearance surfaces 28, 48 when clamped between the clamping surfaces.

The completely assembled combination of the tensioning ring 18, the clamping ring 32 and the clamped annular saw blade 44 is attached to the spindle plate 16 by means of the tensioned ring bolts 20 after assembly.

The annular fluid cavity 50 within the clamping ring 32 opens on the radially innermost face of the clamping ring 32. The fluid cavity 50 includes annular recesses 52, 54 in the radially inner and outer side walls thereof for a purpose to be described.

An annular fluid gasket 56, generally U-shaped in cross section, includes annular ears 58, 59. The ears 58, 59 are constructed and arranged to seat within the annular clamping ring recesses 52, 54 respectively and serve to maintain the annular fluid gasket 56 in position within the annular fluid recess 50.

The annular fluid gasket 56 includes a substantially plane section (the bottom of the U) 60. When the gasket 56 is inserted within the cavity 50, the section 60 protrudes axially just slightly beyond the clearance surfaces 26, 48 of the clamping ring 32 and is substantially coincident with the said clamping surfaces 26, 46.

The gasket 56 may be made of any suitable material of a durometer capable of withstanding the working pressures to be discussed hereinafter, such as polyurethane or the like.

A water soluble, hydraulic-pressure-transmitting fluid 61 is contained within the annular fluid cavity 50 and bears against the inside of the section 60 (the bottom portion of the U-shaped gasket 56). The outside of the section 60, in turn, bears against the annular cutting blade 44 when pressure is applied to the hydraulic fluid 61.

The fluid 61 is introduced into the cavity 50 through a fluid conduit 62 which opens into the cavity 50 on one end. The conduit 62 is closed at its other end on the periphery of the clamping ring 32 by an hydraulic fluid check valve 64 which is especially designed to withstand operating pressures in the range of 1,500 to 1,600 psi.

An hydraulic fluid outlet bleed fitting 66 (see FIG. 1) is located approximately 180° on the other side of the periphery of the clamping ring 32 and communicates with the annular conduit 50 through a separate conduit (not shown). When the conduit 50 is initially filled out with the hydraulic fluid 61, the hydraulic fluid outlet 66 is opened to permit the escape of any air which might be trapped within the conduit 50.

Once the conduit 50 is completely filled and hydraulic fluid 61 and an excess thereof is exiting from the hydraulic fluid outlet 66, the outlet is closed and pressure is applied through the fluid check valve assembly 64 to pressurize the hydraulic fluid 61 within the conduit 50 to the desired working pressure.

Despite the use of locating pins of high tolerance and corresponding locating holes of high tolerance within the outer periphery of the saw blade 44, precise tensioning of the saw blade such as provided by the subject invention is required to maintain the inside diameter cutting edge 68 in perfect round. A difference of only one-half of a mil, necessary to permit mounting of the blade on a locating pin, is sufficient to cause the inside diameter cutting surface to be sufficiently out of round to result in the tensioned blade having an elliptical cutting surface. This elliptical cutting surface results in excessive blade wear due to use of only a portion (the innermost portion) of the cutting surface, as well as rendering control of the depth of cut more difficult where precise control of that parameter is required.

In operation, the annular saw blade 44, having locating-pin holes (not shown) located close to the periphery thereof, is placed with the locating-pin holes in registry with locating pins (not shown) situated either in the tensioning ring 18 or in the clamping ring 32. An annular fluid gasket 56 is placed with the annular projections 58, 59 thereof within the annular recesses 52, 54 of the clamping ring 32 with the bottom section 60 of the U-shaped gasket outermost.

The tensioning ring 18 and the clamping ring 32 are positioned with the annular recesses 30, 50 facing one another and are firmly joined together by means of the clamping ring bolts 34. The assembly of the tensioning ring 18, the clamping ring 32, the clamped annular saw blade 44 and the positioned gasket 56 is then attached to the spindle plate 16 by means of the tension ring bolts 20, which are then tightened to firmly connect the assembled struction to the hub 12.

A source of supply (not shown) of pressurized hydraulic fluid 61 is attached to fluid check valve 64 and hydraulic fluid outlet bleed valve 66 is opened to atmosphere. The hydraulic fluid 61 is pumped, through the check valve 64 and the conduit 62 to the annular cavity 50 and completely fills the cavity, forcing any air contained therein out of the opened hydraulic fluid outlet bleed valve 66.

When hydraulic fluid 61 exits from the hydraulic fluid outlet bleed valve 66, indicating that the cavity 50 is completely filled with hydraulic fluid, the hydraulic fluid outlet valves 66 is closed to atmosphere, and the desired working pressure is applied to the hydraulic fluid 61 within the fluid cavity 50.

As working pressure is applied to the fluid 61, the hydraulic fluid distributes the pressure evenly throughout the entire annular cavity 50. The applied hydraulic pressure is, in turn, transmitted to the flat face 60 of the U-shaped gasket 56 which, in turn, presses uniformly against the annular saw blade 44. The pressure on the saw blade 44 deforms the blade and forces it partially into the circumferential tensioning ring recess 30.

The unsupported portion of the annular saw blade 44 contained within the inner periphery of the tensioning and clamping rings 18, 32 is thereby placed in tension evenly about the entire periphery of the blade thereof. Due to the aforementioned raised or displaced axial surface of each of the clamping surfaces 26, 46 the clearance between the clearance surfaces 28, 48 of the tensioning and clamping rings 18, 32 permits the annular saw blade 44 to move between the clearance surfaces despite its being firmly clamped between the clamping surfaces.

The uniform pressure which is exerted on the annular saw blade 44 by virtue of the pressure exerted by the hydraulic fluid 61 through the medium of the gasket 56, evenly tensions the inside diameter cutting surface 68 of the annular saw blade 44. The uniform tensioning of the cutting surface 68 permits full use of the entire circumferential surface of the diamond bort 70 facing the internal diameter of the saw blade as it is forced against and annularly located by the surface 28.

Additionally, the presence of foreign matter on the part of the annular saw blade 44 in contact with the straight portion 60 of the gasket 56 will not impair the uniform tensioning. The gasket 56 will merely temporarily deform around the foreign matter to provide and maintain the uniform tension required. Also, increased pressure on the fluid 61 merely increases the seal of the annular projections 58, 59 in the corresponding annular grooves 52, 54.

Though a water soluble hydraulic fluid 61 is contemplated in the preferred embodiment, thus making clean-up of any fluid which creeps about the seal 56 much easier than with standard hydraulic fluid, the fluid itself never impinges directly upon the annular saw blade 44, but rather deforms and tensions the blade through the medium of the gasket 56. This lack of contact greatly facilitates ease of maintenance of the equipment.

In addition to the gasket 56 having the further advantage of not retaining a permanent set once deformed (as is the case with the majority of 0 rings), the use of a gasket has the additional advantage of permitting blade changing without disrupting the gasket. When a blade change is necessary, the working pressure in the cavity 50 (which is on the order of 1000 to 1600 psi) is merely reduced to approximately zero psi. This reduction of pressure merely reduces the deformation of the straight part 60 of the U-shaped gasket sufficiently to permit removal of the blade 44 upon the unclamping thereof. A new blade is then inserted as described hereinbefore and the working pressure of 1,000 to 1,600 psi is once again established in a remarkably short time.

Further, the use of the gasket 56 has the additional advantage of not requiring replacement of the tensioning medium (here the water soluble hydraulic fluid 61) during change of blades. The fluid 61 within the cavity 50 is merely added to or subtracted from to increase or decrease the pressure.

As will be readily apparent to those skilled in the art, the invention may be used in other specific forms or for other purposes without departing from its spirit or essential characteristics. For example, the clamping ring may be constructed so that the screws 34 may be inserted from the opposite side of the clamping ring 32 thus permitting removal of the clamping ring without removal of the tensioning ring 18. The present embodiments are, therefore, to be considered as illustrative and not restrictive, the scope of the invention being indicated by the claims rather than by the foregoing description, and all changed which come within the meaning and range of equivalence of the claims are therefore intended to be embraced therein.

What is claimed is:

1. A blade mounting and tensioning apparatus comprising first and second annular clamping members, means for clamping the periphery of a blade between said clamping members, an annular fluid channel within said first clamping member located radially inwardly of said clamping means and having an opening therein confronting one side of said blade, an annular recess channel within said second clamping member radially aligned with said annual fluid channel and having an opening therein confronting the other side of said blade, a deformable gasket within said annular fluid channel opening, a fluid within said annular fluid channel, said gasket being constructed and arranged to seal said fluid within said annular fluid channel against contact with said blade and further constructed and arranged to bear against a clamped blade upon pressure being exerted on said fluid whereby said pressure uniformly deforms said gasket against said blade thereby uniformly deforming said blade into said recess channel and uniformly tensioning said blade.

2. A blade mounting and tensioning apparatus according to claim 1 wherein each of said clamping members includes a clamping surface and a clearance surface, said clearance surfaces being axially displaced from each other with respect to the location of said clamping surfaces whereby said clearance surfaces provide clearance therebetween for a blade, said annular fluid channel being located within said clamping member radially inward of said clamping surface.

3. A blade mounting and tensioning apparatus according to claim 2 wherein said second clamping member includes annular locating means for selectively fixing the annular position of said blade with respect to said clamping member.

4. A blade mounting and tensioning apparatus according to claim 1 wherein said fluid means comprises a water-soluble fluid and said annular fluid channel includes a fluid check valve inlet assembly and an hydraulic pressure relief valve circumferentially spaced therefrom for use in substantially completely filling said fluid cavity with said water soluble hydraulic fluid.

5. A blade mounting and tensioning apparatus according to claim 1, said fluid channel including gasket retaining means, said gasket being generally U-shaped in cross section and including gasket retaining means for coacting with said fluid channel gasket retaining means for retention of said gasket within said fluid channel.

6. A blade mounting and tensioning apparatus according to claim 1, said fluid channel including at least one annular groove therein, said gasket being generally U-shaped in cross section and including at least one annular projection constructed and arranged to coact with said annular groove for retaining said gasket within said fluid channel and sealing said fluid therein upon pressure being exerted on said fluid.

7. A blade mounting and tensioning apparatus according to claim 1, said fluid channel including first and second radially displaced annular grooves therein, said gasket being generally U-shaped in cross section and including first and second radially displaced annular projections constructed and arranged to coact with said first and second annular grooves for retaining said gasket within said fluid channel and sealing said fluid therein upon pressure being exerted on said fluid.

8. An annular mounting and tensioning apparatus for mounting and tensioning relatively thin deformable objects, said apparatus comprising annular clamping means for clamping the periphery of said object, an hydraulic fluid channel located radially inward of said clamping means, water soluble hydraulic fluid within said fluid channel, a deformable gasket located within said fluid channel radially inward of said clamping means, said gasket being constructed and arranged to seal said fluid within said fluid channel and axially bear against said object on one side thereof in response to pressurization of said fluid thereby deforming said object, means axially aligned with said gasket for accommodating said deformation of said object caused by said gasket bearing thereagainst.

9. An annular mounting and tensioning apparatus according to claim 8, said fluid channel including at least one annular groove therein, said gasket being generally U-shaped in cross section and including at least one annular projection constructed and arranged to coact with said annular groove for retaining said gasket within said fluid channel and sealing said fluid therein upon pressure being exerted on said fluid.

10. An annular mounting and tensioning apparatus according to claim 8, said fluid channel including first and second radially displaced annular grooves therein, said gasket being generally U-shaped in cross section and including first and second radially displaced annular projections constructed and arranged to coact with said first and second annular grooves for retaining said gasket within said fluid channel and sealing said fluid therein upon pressure being exerted on said fluid.

* * * * *